Feb. 23, 1926.  1,574,672
C. McCARROLL-DOULL
SAFETY HARNESS FOR CHILDREN
Filed July 3, 1924   2 Sheets-Sheet 1
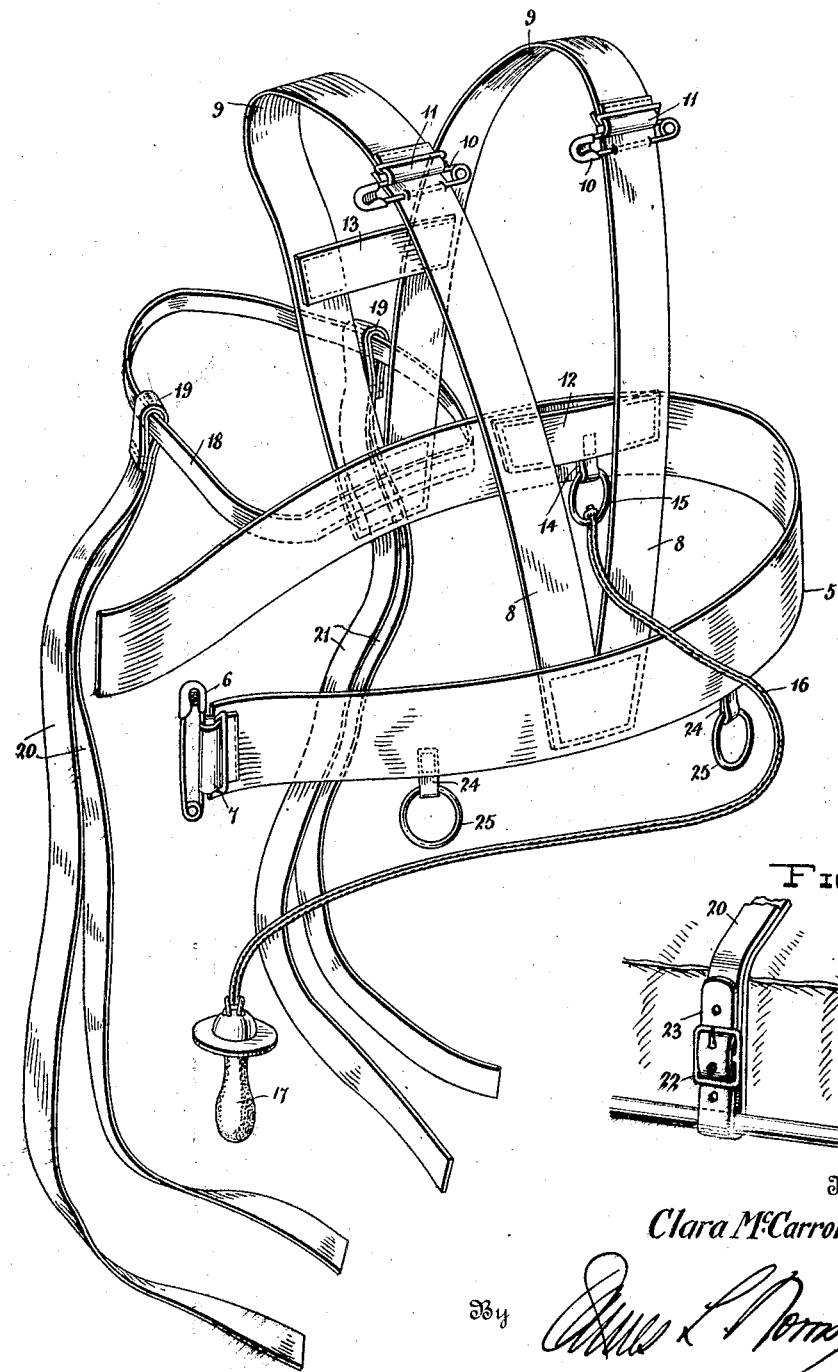
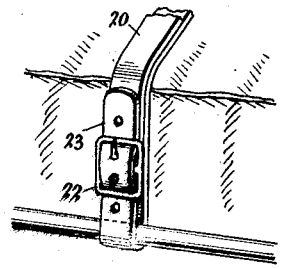
Inventor
Clara M<sup>c</sup>Carroll-Doull,
By
Attorney Feb. 23, 1926.
C. McCARROLL-DOULL
1,574,672
SAFETY HARNESS FOR CHILDREN
Filed July 3, 1924
2 Sheets-Sheet 2

Inventor
Clara McCarroll-Doull,
By
Attorney

Patented Feb. 23, 1926.

UNITED STATES PATENT OFFICE.

CLARA McCARROLL-DOULL, OF BUTTE, MONTANA.

SAFETY HARNESS FOR CHILDREN.

Application filed July 3, 1924. Serial No. 724,171.

*To all whom it may concern:*

Be it known that I, CLARA McCARROLL-DOULL, a citizen of the United States, residing at Butte, in the county of Silver Bow and State of Montana, have invented new and useful Improvements in Safety Harness for Children, of which the following is a specification.

This invention relates to safety harness particularly adapted for application to children, and the primary object of the same is to provide a device of the class specified that may be readily applied to and removed from a child and particularly advantageous in keeping a baby or young child from falling out of a bed, cradle, bassinet or buggy or for use in holding toys, nursing bottles and other devices. A further object of the invention is to provide safety harness of the character specified that will not inconvenience or hinder a baby or young child from free action of the body and permit the child when in a bed or cradle to readily turn to either side or on the stomach or back and be perfectly comfortable, and also permit the child to sit up if he wishes to do so, especially when used in connection with a high-chair or buggy or in a bed, and prevent the child from falling out of the bed or other device. A still further object of the invention is to generally improve safety harness for babies and young children and have the same of such strength and durability as to be practicable in service and whereby a child may be held in the position desired with freedom of action or bodily movement without liability of cramping any part of the body and of injury.

With these and other objects and advantages in view, the invention consists in the construction and arrangement of the several parts which will be more fully hereinafter described and claimed.

In the drawings:

Fig. 1 is a large perspective view of the improved safety harness;

Fig. 2 is a detail view of a portion of the improved harness, showing a different form of fastening means therefor.

Figure 4:
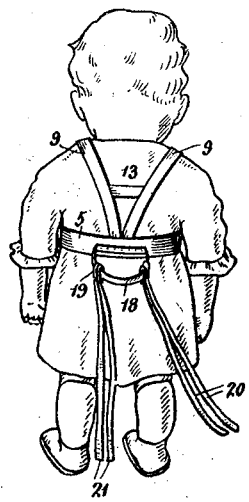

The numeral 5 designates a belt having a safety pin 6 secured at one end by a loop 7 of such form as to give the pin freedom of action, particularly when connecting and disconnecting the same. Secured to the front portion of the belt 5 are the converged ends of front shoulder strap sections 8, and to the rear portion of the belt 5 the converged ends of back shoulder strap sections 9 are secured and have at their free ends safety pins 10 carried by loops 11 formed at said latter ends and adapted to be fastened to the free ends of the front shoulder strap sections 8. The front and rear shoulder strap sections are respectively connected by cross straps 12 and 13. The cross strap 12 has a depending loop 14 secured to the lower portion thereof and carrying a ring 15, to which a cord or small attaching strap or loop 16 is connected for attachment to the improved harness of a nipple or pacifier 17, or any other device that may be desired. The rear portion of the belt adjacent the point of attachment of the lower converged ends of the back shoulder strap sections 9 has an enlarged loop 18 secured thereto, and loosely mounted on this loop at opposite portions thereof and free to slide thereon are doubled or looped ends 19 of securing straps 20 and 21, which are arranged in pairs as shown and of any length desired. The straps 20 and 21 in the structure shown by Fig. 1 have free extremities that may be wrapped around and tied to parts of beds, chairs, bassinets, buggies, or other devices, but instead of tying the ends of these securing straps, they may be provided with buckles 22 and apertured extremities 23, as shown by Fig. 4, for fastening the same around a bed-rail or a corresponding part of any other device to which the said straps are applied. The front portion of the belt 5 also has depending loops 24 secured thereto and provided with rings 25, these rings being adapted for attaching a nursing bottle, toys or other devices thereto.

In the application of the improved safety harness the shoulder strap sections are fitted over the shoulders of the child and the belt 5 is then secured by connecting the free extremity thereof to the safety pin 6, the latter being adjustable as desired through the medium of the pin and without resorting to buckles and apertures in the attaching extremities of the belt. The shoulder strap sections may be adjusted to accommodate an easy and comfortable fitting of the harness to children of various sizes through the medium of the safety pins 10, and in various uses of the harness the securing straps 20 and 21 may be attached or at times left hanging loose or drawn up and secured to the loop 18, to avoid tripping the child, especially at the walking age, and when it is desired to use the harness for carrying toys or a nursing bottle or other device It is proposed to construct the several parts of the improved harness of any suitable material such as webbing, silk, leather or waterproof fabrics, and while the safety pin fastening means 6 and 10 are preferred in view of the simplicity thereof, it will be understood that other fastening devices may be used when desired. It is also proposed to have the safety pins 6 and 11 so connected to the several parts with which they are used as to permit them to be detached, especially when the improved harness is made of material that can be readily cleaned, or replace safety pins that may have become impaired for use by devices of a similar character.

Figure 3:
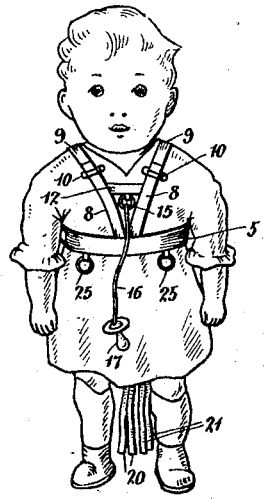
Figs. 3, 4, 5 and 6 show the improved harness applied to a child in various positions and illustrating a part of the various uses for the improved structure.
Figure 5:
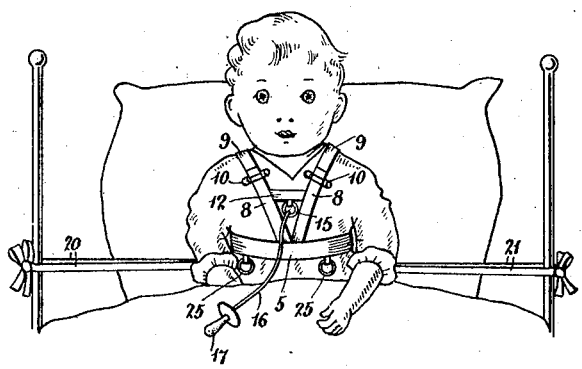
Figure 6:
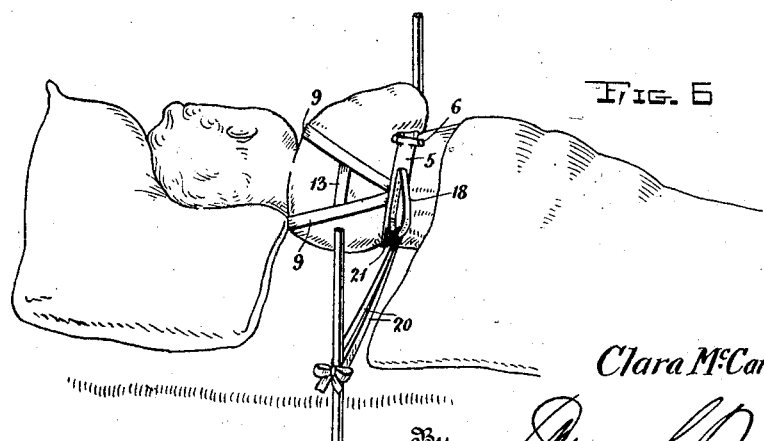

The advantages in the use of the improved device are clearly illustrated by Figs. 3 to 6, inclusive, and it will be seen that the child is not inconvenienced in the least by wearing the improved harness as shown by Fig. 3, and also that the securing straps 20 and 21 may be of such length as to avoid interference with the walking progress of the child or avoid trailing on the ground. As shown by Fig. 5, the securing straps 20 and 21 are illustrated as attached to the opposite uprights or bars of a bed and tied and the child permitted to sit upright in the bed, or a child may be permitted to assume a recumbent position or lie with comfort on a bed or similar device and be prevented from falling out and at the same time the improved harness will serve to keep the child covered without the least inconvenience. In all applications of the improved harness the essential feature is the protection of the child without undue bodily restriction or inconvenience, and the enlarged loop 18 at the back of the belt permits a wide range of adjustment and easy action of the securing straps 20 and 21, particularly in view of the sliding application of these straps to the said loop.

While it is preferred to use the improved safety harness on a child, it will be understood that the same may be enlarged in proportions and general dimensions and used on adults, and moreover, the improved harness in either application to a child or adult overcomes the disadvantages incident to the use of a straight jacket or other retaining means which obstruct freedom of action and relaxation of the body of the wearer.

What is claimed as new is:

In safety harness of the class specified, a waistband having means for supporting the same from the shoulders of the wearer to diminish strain on the abdomen during movement of the wearer, and an enlarged loop fixed at the center of the back of the belt and having attaching devices freely slidable from side to side over the loose portion of the loop, the loop being sufficiently stiff to maintain its form and permit freedom of operation of the fastening devices thereon and the projection of the loop from the rear of the belt permitting unrestricted movement of the body of the wearer to different positions and effect a self-adjustment of the fastening devices to the various positions.

In testimony whereof I have hereunto set my hand.

CLARA McCARROLL-DOULL.